US006786941B2

(12) United States Patent
Reeves et al.

(10) Patent No.: US 6,786,941 B2
(45) Date of Patent: Sep. 7, 2004

(54) METHODS OF CONTROLLING THE DENSITY AND THERMAL PROPERTIES OF BULK MATERIALS

(75) Inventors: Robert A. Reeves, Arvada, CO (US); Charlie W. Kenney, Littleton, CO (US); Mark H. Berggren, Golden, CO (US)

(73) Assignee: Hazen Research, Inc., Golden, CO (US)

( * ) Notice: Subject to any disclaimer, the term of this patent is extended or adjusted under 35 U.S.C. 154(b) by 11 days.

(21) Appl. No.: 10/197,454

(22) Filed: Jul. 16, 2002

(65) Prior Publication Data

US 2003/0132326 A1 Jul. 17, 2003

Related U.S. Application Data

(62) Division of application No. 09/608,722, filed on Jun. 30, 2000, now Pat. No. 6,422,494.

(51) Int. Cl.[7] .......... C01L 5/00; B07B 15/10
(52) U.S. Cl. .......... 44/503; 44/592; 44/620; 209/10
(58) Field of Search .......... 241/81, 24.31; 44/503, 592, 595, 608, 520; 209/10

(56) References Cited

U.S. PATENT DOCUMENTS

| | | | | | |
|---|---|---|---|---|---|
| 949,445 | A | * | 2/1910 | Rodman | 106/285 |
| 2,049,814 | A | | 8/1936 | Marquard | 241/81 |
| 2,204,781 | A | * | 6/1940 | Watties | 44/541 |
| 2,729,397 | A | | 1/1956 | Weston | 241/81 |
| 3,145,644 | A | | 8/1964 | Johnson | 241/22 |
| 3,181,800 | A | | 5/1965 | Noren et al. | 241/22 |
| 3,189,436 | A | * | 6/1965 | Burstlein | 75/750 |
| 3,243,889 | A | | 4/1966 | Ellman | 34/9 |
| 3,346,198 | A | | 10/1967 | Roberts et al. | 241/22 |
| 3,415,667 | A | * | 12/1968 | Cummings | 501/109 |
| 3,421,991 | A | | 1/1969 | Hildebrandt | 241/20 |
| 3,912,174 | A | | 10/1975 | Karpinski et al. | 241/24 |
| 3,933,443 | A | * | 1/1976 | Lohrmann | 44/503 |
| 3,957,456 | A | | 5/1976 | Verschuur | 44/10 E |
| 3,969,124 | A | | 7/1976 | Stewart | 106/56 |
| 4,044,904 | A | * | 8/1977 | Trumbull et al. | 414/808 |

(List continued on next page.)

FOREIGN PATENT DOCUMENTS

| | | | | |
|---|---|---|---|---|
| DE | 2335042 | | 7/1973 | 241/24.31 |
| DE | 2513366 | | 10/1976 | 241/24.31 |
| DE | 3827397 | * | 2/1990 | C06D/5/00 |

OTHER PUBLICATIONS

Furnas, C.C.; "Grading Aggregates"; Industrial and Engineering Chemistry; vol. 23, No. 9; Sep. 1981; pp. 1052–1058.*

(List continued on next page.)

*Primary Examiner*—Donald R Walsh
*Assistant Examiner*—Daniel K Schlak
(74) *Attorney, Agent, or Firm*—Sheridan Ross P.C.

(57) ABSTRACT

Methods of controlling the bulk density, permeability, moisture retention and thermal properties of bulk materials are provided by selectively sizing the bulk material. Preferably, the bulk material is sized into successively smaller particle size fractions, with the largest fraction placed into a confined area. The next smaller size fraction is then added until the largest sized fraction begins to dilate. The next successive smaller size fraction is added until the mixture beams to dilate, with the process being continued until the smallest size fraction is used. Methods of decreasing the density of bulk materials are also provided.

4 Claims, 8 Drawing Sheets

U.S. PATENT DOCUMENTS

| | | | | | |
|---|---|---|---|---|---|
| 4,078,902 | A | * | 3/1978 | Olson | 44/559 |
| 4,083,940 | A | | 4/1978 | Das | 423/449 |
| 4,156,595 | A | * | 5/1979 | Scott et al. | 44/578 |
| 4,170,456 | A | | 10/1979 | Smith | 44/1 F |
| 4,186,054 | A | | 1/1980 | Brayton et al. | 201/6 |
| 4,188,231 | A | * | 2/1980 | Valore | 106/700 |
| 4,190,422 | A | * | 2/1980 | Hitzrot, Jr. | 51/309 |
| 4,231,978 | A | * | 11/1980 | Crookston | 264/660 |
| 4,244,813 | A | * | 1/1981 | Moyer, Jr. | 209/5 |
| 4,257,848 | A | | 3/1981 | Brayton et al. | 202/82 |
| 4,299,205 | A | * | 11/1981 | Garfield | 126/674 |
| 4,304,636 | A | | 12/1981 | Kestner et al. | 201/20 |
| 4,396,394 | A | | 8/1983 | Li et al. | 44/1 G |
| 4,401,436 | A | | 8/1983 | Bonnecaze | 44/1 G |
| 4,403,996 | A | * | 9/1983 | Matsuura et al. | 44/502 |
| 4,450,046 | A | | 5/1984 | Rice et al. | 201/20 |
| 4,498,523 | A | * | 2/1985 | Bowman et al. | 164/477 |
| 4,511,363 | A | | 4/1985 | Nakamura et al. | 44/1 G |
| 4,599,250 | A | | 7/1986 | Cargle et al. | 427/320 |
| 4,613,429 | A | | 9/1986 | Chiang et al. | 209/5 |
| 4,650,495 | A | | 3/1987 | Yan | 44/1 G |
| 4,662,894 | A | * | 5/1987 | Greenwald, Sr. | 44/280 |
| 4,759,772 | A | | 7/1988 | Rogers et al. | 44/501 |
| 4,778,482 | A | | 10/1988 | Bixel et al. | 44/501 |
| 4,784,333 | A | | 11/1988 | Hikake et al. | 241/81 |
| 4,797,136 | A | | 1/1989 | Siddoway et al. | 44/501 |
| 4,828,575 | A | | 5/1989 | Bellow, Jr. et al. | 44/501 |
| 4,828,576 | A | | 5/1989 | Bixel et al. | 44/501 |
| 4,863,317 | A | * | 9/1989 | Boyle | 406/109 |
| 4,957,596 | A | | 9/1990 | Ukita et al. | 201/20 |
| 5,022,317 | A | * | 6/1991 | Williams | 100/35 |
| RE33,788 | E | | 1/1992 | Clay | 149/1 |
| 5,087,269 | A | | 2/1992 | Cha et al. | 44/626 |
| 5,124,162 | A | | 6/1992 | Boŝkovićet al. | 426/96 |
| 5,263,650 | A | | 11/1993 | Yasui et al. | 241/22 |
| 5,314,124 | A | | 5/1994 | Kindig | 241/20 |
| 5,338,573 | A | * | 8/1994 | Davies et al. | 427/331 |
| 5,435,813 | A | | 7/1995 | Evans | 44/620 |
| 5,545,796 | A | * | 8/1996 | Roy et al. | 588/4 |
| 5,609,458 | A | | 3/1997 | Hanaoka et al. | 414/173 |
| 5,725,613 | A | | 3/1998 | Reeves et al. | 44/501 |
| 5,795,484 | A | * | 8/1998 | Greenwald, Sr. | 210/696 |
| 5,795,856 | A | | 8/1998 | Hatano et al. | 510/444 |
| 5,819,945 | A | | 10/1998 | Laskowski et al. | 209/2 |
| 5,919,277 | A | | 7/1999 | Reeves et al. | 44/501 |
| 5,968,891 | A | | 10/1999 | Mallari et al. | 510/444 |
| 6,083,286 | A | * | 7/2000 | Ono | 44/280 |
| 6,085,912 | A | * | 7/2000 | Hacking et al. | 209/17 |
| 6,126,705 | A | * | 10/2000 | Pryor et al. | 44/607 |
| 6,231,627 | B1 | | 5/2001 | Reeves et al. | 44/620 |
| 6,395,662 | B1 | * | 5/2002 | Li et al. | 501/127 |
| 6,524,354 | B2 | * | 2/2003 | Sinha et al. | 44/564 |

OTHER PUBLICATIONS

Translation of German Patent 2,335,042—Published Jan. 30, 1975—Inventor: Rosslyn Mitchell.*

Edwards, J.H.; "Potential sources of $CO_2$ and the options for its large–scale utilization now and in the future"; *Catalysis Today*, 1995; 23 pp. 59–66.

Keim, Willi; "Industrial Uses of Carbon Dioxide"; in *Carbon Dioxide as a Source of Carbon*; M. Aresta and G. Forti, eds.; D. Reidel Publishing Co.; 1987; pp. 23–31.

Rigsby et al., "Coal self–heating: problems and solutions", pp. 102–106 British Mentine Technils or Procedings of 2nd Int'l coal Transportation and Hearlling conference.

Riley et al., "Use of Carbon Dioxide to Reduce Self–Heating in Barged Coal"; *Journal of Coal Quality*, Apr. 1987, pp. 64–67.

Ripp, John; "Understanding coal pile hydrology can help BTU loss in stored coal"; pp. 146–150 10–1983 International coal testing reference.

Sapienze et al., "Carbon Dioxide/Water for Coal Beneficiation"; in *Mineral Matter and Ash in Coal*; 1986; American Chemical Society; pp. 500–512.

Furnas, C.C.; Flow of Gases Through Beds of Broken Solids; Bulletin 307; United States Department of Commerce, Bureau of Mines; United States Government Printing Office; 1989; pp. 74–83.

Standish et al., "Optimization of Coal Grind for Maximum Bulk Density," Powder Technology, vol. 68, 1991, pp. 175–186.

* cited by examiner

METHODS OF CONTROLLING THE DENSITY AND THERMAL PROPERTIES OF BULK MATERIALS

The present application is a divisional of U.S. patent application Ser. No. 09/608,722, filed Jun. 30, 2000, which is incorporated herein by reference in its entirety (now U.S. Pat. No. 6,422,494, issued Jul. 23, 2002.)

FIELD OF THE INVENTION

The present invention relates to methods of controlling the density, permeability, moisture retention and thermal properties of bulk materials and to compositions produced by the methods.

BACKGROUND OF THE INVENTION

Efficient, low cost transportation and storage of bulk materials from mines and/or factories to markets are vital to certain industries because the costs of transporting and storing bulk material are often major components of the total cost of the delivered product.

Coal is one of the world's largest bulk commodities moved by rail, truck, inland barges and ocean-going vessels to utilities and steel mills. The cost of transporting coal plays a critical role in expanding markets for coal. Changes in environmental laws in the United States have created a demand for low-sulfur, premium quality steam coal. Before 1975, underground mines in West Virginia and eastern Kentucky supplied most of the premium quality coal needed to meet environmental requirements at coal-fired utilities. Although vast low-cost, strippable reserves of low sulfur coal resided in the West, distance and associated high transportation costs excluded them from serious consideration for Midwestern and Eastern markets. This situation changed as railroads recognized the opportunity for new markets and began investing in unit trains and improved ways and structures to haul large tonnage shipments. As a result, large productive mines were developed in the Powder River Basin (PRB) in Wyoming. Production of PRB coal has risen steadily since 1980 replacing higher cost eastern coal. Production is expected to rise to 400 million tons per year in the near future. Since transportation can account for up to 75% of the total delivered price, it continues to play the critical role in expanding the market for western coal. The increased demand for PRB and other western coal will not be realized unless the railroad companies continue to find ways to reduce costs and improve efficiency.

The market for metallurgical coal is also dependent on the cost of transportation. For example, steel mills are extremely competitive and are constantly looking for lower cost coal to fuel their blast furnaces. Although the best quality metallurgical coal in the world reside in the eastern United States, Australian and South African producers often win contracts because of lower costs. The high cost of transporting coal by rail from eastern mines to port facilities often makes American suppliers non-competitive.

Coal has a low bulk density compared to many other common bulk materials, such as limestone, aggregates, iron ore and fertilizers. Since coal is hauled in the same rail cars, trucks, barges and ocean-going vessels as the more dense bulk materials, less weight can be carried for a given volume of cargo hold. The full weight carrying capacity of many vessels cannot be reached before the volumetric capacity is reached. As a result, costs are increased since the weight capacity of the vessel is underutilized. Consequently, a coal producer is penalized because a rail car cannot be loaded to full weight carrying capacity. One PRB mine operator reported that underweight penalties cost about $100,000 per month, totaling over $1 million ina recent year.

Storage and handling costs are also affected by bulk density similar to transportation costs. As bulk density increases, less storage volume is required to hold the same amount of coal. Smaller stockpiles require less area to hold coal resulting in lower storage costs. Likewise, the smaller volume also requires less loading and unloading time and labor.

When bulk materials are hauled in conveyances such as rail car, barges, and trucks during cold weather, moisture contained in the material may form ice that can adhere to the conveyance. Frozen material, accounting for up to 10 percent of the net payload, may not discharge from the conveyance at the point of delivery. The added weight increases transportation costs by reducing the useful carrying capacity of the conveyance and increasing the weight of the conveyance returned to the producer.

Sub-zero temperatures and long transit times can cause the payload to freeze creating large lumps of aggregated material, particularly when water goes through the material and pools at the bottom of the conveyance before freezing. As a result, special equipment is required to break the frozen lumps into manageable sizes that are compatible with material handling and storage equipment.

Two principal methods are typically used to mitigate the adverse effects of frozen material. The first method involves adding a chemical such as a salt compound or liquid glycol antifreeze to the bulk material to depress the freezing point of water or weaken the ice that binds the solid particles together as described, for example, in U.S. Pat. No. 5,079,036 entitled "Method of Inhibiting Freezing and Improving Flow and Handleability Characteristics of Solid, Particulate Materials" and in U.S. Pat. No. 4,290,810 entitled "Method for Facilitating Transportation of Particulate on a Conveyor Belt in a Cold Environment." The second principal method involves heating the walls of the conveyance to thaw the frozen layer of material adhering to the walls as described, for example, in U.S. Pat. No. 4,585,178 entitled "Coal Car Thawing System" and in U.S. Pat. No. 4,221,521 entitled "Apparatus for Loosening Frozen Coal in Hopper Cars." Several manufacturers offer electric and gas-fired radiant heaters to warm the bottom and sides of a conveyance to melt the frozen layer of material. The choices of chemical or thermal methods depend on the type of conveyance, cost constraints, and material compatibility. Treating frozen materials has become more expensive because many rail cars are fabricated from aluminum, a thermally sensitive material that can corrode when it comes in contact with low-cost salt compounds.

Thawing and chemical treatment methods are time consuming and expensive. Thawing costs range between $0.20 and $0.50 per ton, depending on the source of energy. Chemical treatment costs range between $0.20 and $1.00 per ton, depending on the type of chemical and dose rate.

Most bulk materials that are crushed to a specified topsize for commercial reasons have a naturally occurring particle size distribution that, when plotted, fit under a typical single gaussian curve. Such naturally occurring size distribution does not have the optimum particle size distribution to produce sufficiently high bulk densities to effectively lower transportation and storage costs or to mitigate the effects of freezing. In addition, known methods of altering the thermal properties of bulk materials, such as lowering permeability and increasing moisture retention, result in decreasing the bulk density since the materials are simply crushed into a smaller size in an attempt to increase the surface area of the bulk material.

Compacting or vibrating is commonly used to increase bulk densities by many industrial applications that handle relatively small volumes of high-value fine powders (0.5 mm and smaller). Examples include pharmaceuticals, cosmetics, ceramics, sintered metals, plastic fillers and nuclear fuel elements. However, many applications that involve large volumes of coarse bulk materials (up to 150 mm) cannot effectively use compaction or vibration to control bulk density. If the coarse material is of relatively high value, expensive oil or other chemical additives that modify the particle surface characteristics can be applied to modify bulk density. For example, steel mills typically control bulk density of metallurgical coal feeding cooking ovens by applying additives as described in U.S. Pat. No. 4,957,596 entitled "Process for Producing Coke."

Accordingly, a need exists for low cost methods of controlling the density, permeability and moisture retention of bulk materials. The present invention satisfies this need and provides related advantages.

SUMMARY OF THE INVENTION

The present invention relates to methods of controlling the density, permeability, moisture retention and thermal properties of bulk materials and to compositions produced by such methods. Bulk materials that can be controlled by the present methods include any material that can be fractionated by particle size and include, for example, solid fuel materials, limestone, bulk food products, sulfide ores, carbon-containing materials such as activated carbon and carbon black. Solid fuel materials include, for example, coal, lignite, upgraded coal products, oil shale, solid biomass materials, refuse derived fuels (including municipal and reclaimed refuse), coke, char, petroleum coke, gilsonite, distillation byproducts, wood byproducts, shredded tires, peat and waste pond coal fines.

In one embodiment, the present invention relates to methods of increasing the density of a bulk material by combining two different particle sized fractions to form resulting bulk material having a bimodal size distribution. The methods are generally accomplished by first separating the bulk material into a first size fraction and a smaller size fraction. The smaller size fraction is next separated into a second size fraction and a third size fraction, in which the second size fraction is larger than the third size fraction. The second size fraction is then sized into a fourth size fraction, which is the same size as the third size fraction. The final step is combining the first size fraction with the third and fourth size fractions to produce a densified bulk material. Optionally, the methods can also include a step of sizing the starting bulk material into a desired topsize before separating out a first size fraction.

For example, in one embodiment the method is accomplished by recovering a first size fraction of the bulk material having a particle size of about 1 inch to about 2 inches, followed by recovering a third fraction of the bulk material having a particle size of less than about ¼ inch from a second size fraction having a particle size of about ¼ inch to about 1 inch and subsequently crushing, grinding or pulverizing the second size fraction to form a mixture having a particle size of less than about ¼ inch. In the final step, the first, crushed second and third size fractions are combined to produce a higher density bulk material. Mixing these fractions provides the fine particles an opportunity to occupy the void between the coarse particles to achieve the highest bulk density. Accordingly, the present invention is based, in part, on the discovery that mid-sized particles impede the flow of the fine particles in filling this void, which results in lower bulk density.

In alternative methods for increasing the density of a bulk material, the bulk material is first fractionated into increasingly smaller particle fractions. The largest particle size fraction is placed into a holding area or compartment. The next smaller fraction is then added to fill the void between the larger particles. Filling is continued until the smaller particles begin to dilate the entire mixture (i.e., push the larger particles apart) thus reducing bulk density. At that point, the next smaller size fraction is added filling the void until the entire mixture begins to dilate. This process is continued with each successive smaller size fraction. Although the methods of this embodiment may require more processing steps than the first embodiment, it can be used to obtain a higher density and, therefore, may be preferred for certain applications.

The methods of increasing the density of bulk materials result in bulk materials having a density of at least 55 lbs/ft$^3$, with a useful range between about 55 lbs/ft$^3$ to about 60 lbs/ft$^3$.

Methods for improving thermal properties of bulk materials without reducing density are also provided. The methods are generally accomplished by first separating the bulk material into a first size fraction and a smaller size fraction. The smaller size fraction is next separated into a second size fraction and a third size fraction, in which the second size fraction is larger than the third size fraction. The second size fraction is then sized into a fourth size fraction, which is the same size as the third size fraction. The final step is combining the first size fraction with the third and fourth size fractions to produce a final bulk material having improved thermal properties, such as reduced permeability and increased moisture retention. Optionally, the methods can also include a step of sizing the starting bulk material into a desired topsize before separating out a first size fraction.

Preferably, the permeability of the final bulk material is reduced at least about 50%, more preferably is reduced at least about 90%, while the moisture retention capacity is increased at least about 25%, more preferably at least about 50%. For coal, the permeability is preferably less than about 0.040 cm/sec, more preferably less than about 0.020 cm/sec, and most preferably less than about 0.004 cm/sec. In a further embodiment, the present invention also provides methods for reducing the density of bulk materials. The density of bulk materials can be reduced by creating more void space between particles to promote, for example, flow of gases and liquids between particles. Accordingly, such methods would be useful for storing or treating bulk materials with chemicals or when exposure to heat, air (i.e. oxidation), other gases or liquids is desired.

DETAILED DESCRIPTION OF THE INVENTION

Figure 1:
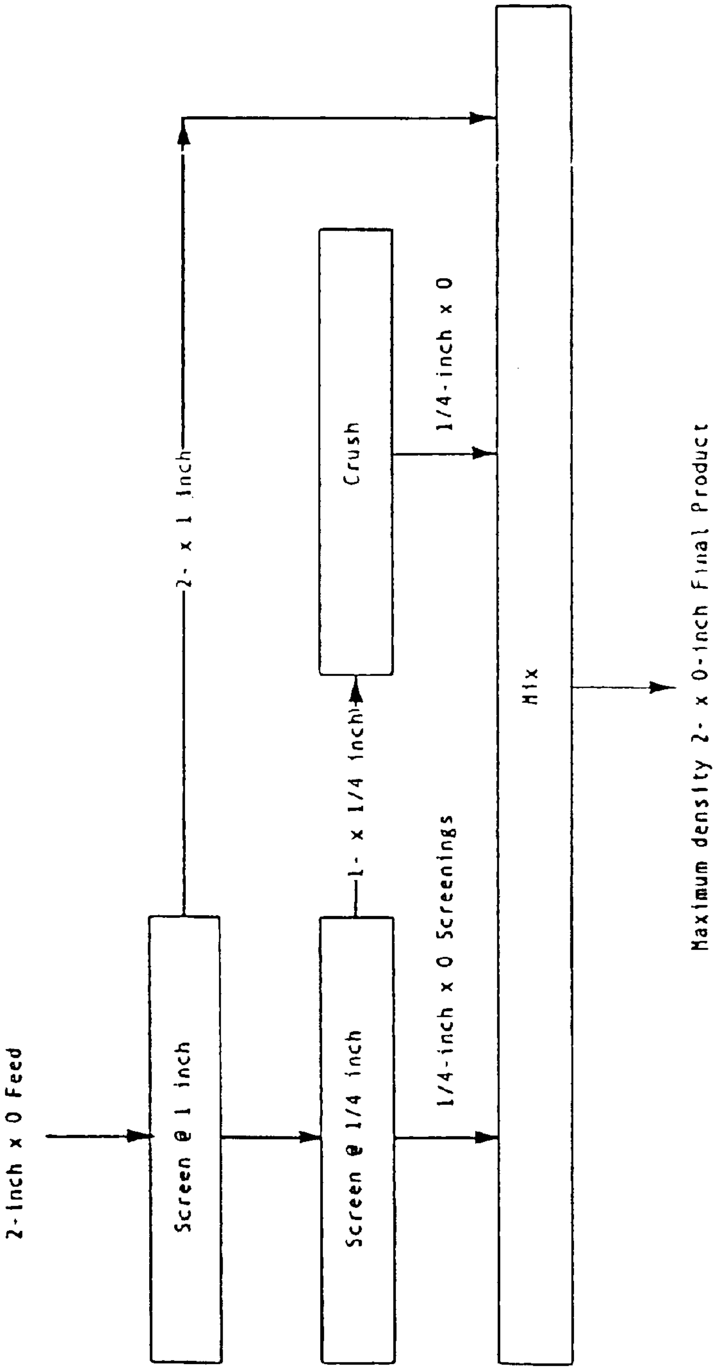
FIG. 1 is a flowchart of the method of increasing the density of bulk materials by combining two particle size fractions.

The present invention provides methods of controlling the density and thermal properties of bulk materials, and the bulk materials produced according to the methods. The density, permeability and moisture retention of bulk materials can be either increased or reduced by the methods of the present invention depending on the intended application.

In one embodiment of the present invention, methods of increasing the density of bulk materials are provided that result in a reduced overall volume of the build material, which reduces the amount of space required for transportation and/or storage. Several factors influence bulk density including particle shape size distribution, surface characteristics, the size and shape of the container holding the bulk material, the manner in which the bulk material is deposited into the container, and vibration and pressure compaction.

Particulate bulk materials are a collection of solid particles and air occupying the interstitial space between the particles. The percentage of interstitial space or voids depends on the nesting of the individual particles in relation to each other. Thus, an ideal particle size distribution provides sufficient quantity of fine particles to fill the void spaces surrounding coarse particles. Bulk density (i.e., the weight of material per unit volume occupied by the material) is inversely proportional to voids. Accordingly, the various methods of the present invention are directed to reducing voids to obtain higher bulk density and increasing voids to obtain lower bulk density by controlling particle size distribution in the resulting composition.

As used herein, the term "bulk material" refers to any solid materials that are produced, shipped and/or stored in quantities that are generally measured on a tonnage basis and that can be fractionated or separated by size. Bulk materials can include, for example, solid fuel materials, bulk food products, sulfide ores, carbon-containing materials, such as activated carbon and carbon black, and other minerals and ores.

As used herein, the term "solid or bulk fuel material" generally refers to any solid material that is combusted or otherwise consumed for a useful purpose. More particularly, solid fuel materials can include, for example, coal, upgraded coal products, and other solid fuels. The term "coal" as used herein includes anthracite, bituminous coal, sub-bituminous coal and lignite. The present invention is particularly suited for bituminous coal, sub-bituminous coal and lignite. The term "upgraded coal products" includes thermally upgraded coal products, coal products produced by beneficiation based on specific gravity separation, mechanically cleaned coal products, and coal products such as stoker, breeze, slack and fines.

Examples of other solid fuels included, without limitation, oil shale, solid biomass materials, refuse derived fuels (including municipal and reclaimed refuse), coke, char, petroleum coke, gilsonite, distillation byproducts, wood byproducts and their waste, shredded tires, peat and waste pond coal fines. The term "refuse derived fuels" can include, for example, landfill material from which non-combustible materials have been removed.

Examples of ores and minerals that are mined include, without limitation, sulfide ores, gravel, rocks and limestone. Limestone, for example, is particularly useful in cement manufacture, road construction, rail ballast, soil amendment or flue gas sorbent used in sulfur dioxide removal at coal-fired power plants.

Examples of bulk food products include, for example, bulk grains, animal feed and related byproducts. The term "bulk grains" include, for example, wheat, corn, soybeans, barley, oats and any other grain that are transported and/or stored.

As used herein, the term "fractionation" refers to the process of separating different particle sizes of a bulk material by any means known to those skilled in the art, including, for example, screens with varying mesh sizes or filters with varying pore size. Such fractionation means can be made of any suitable material including, for example, metal, plastics or other polymers with desired apertures (i.e. pore or hole size). In addition, fractionation using such screens or filters can be facilitated by contemporaneous shaking or vibrating to speed the fractionation process. Vibrating screens are particularly useful for dry coarse size separations 6 mm and greater, the size ranges of interest for bulk materials such as coal. If finer size separations are desired, cyclones can be used to classify materials between 0.01 and 1 mm. As noted above, the present invention includes methods of increasing the density of bulk materials compared to normal densities of naturally-occurring particle size distributions (for example, 45–50 lbs/ft$^3$) as described above. Several benefits result from increasing the density of bulk materials. For example, increasing the bulk density of coal from the existing typical value of 50 pounds per cubic foot by 10% would likely eliminate underweight penalties described above. Other benefits for rail transport include, for example: (i) lower center of gravity; (ii) smaller and lighter rail cars; (iii) less total trailing load; (iv) shorter trains; and (iv) less loading and unloading time. Likewise, barges, seaway self-unloaders and ocean-going vessels could haul more tonnage per voyage thus reducing costs. In addition, cold weather operations on the Great Lakes and Upper Mississippi River, for example, could increase the amount of coal hauled before ice forces the waterways to close.

Figure 4:
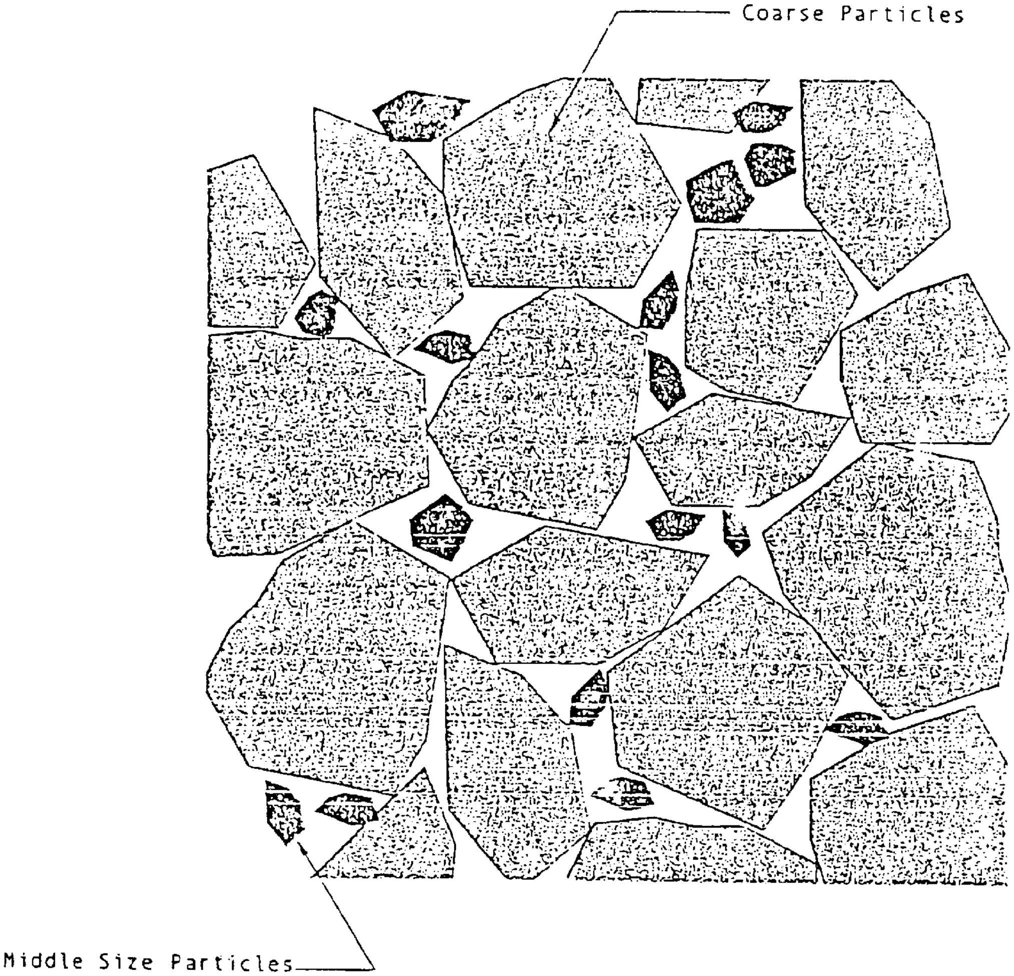
FIG. 4 is a void-filling depiction of a composition produced by combining two particle size fractions in which the composition has a density of 105% of normal and a void space of 35%.

One embodiment of these methods involves the use of a bi-modal size distribution. A bi-modal size particle size distribution is characterized by bulk material having two discontinuous particle size ranges as depicted, for example, in FIG. 4. Another way to describe a bi-modal size distribution is with reference to a graph plotting the total weight of particles having a first size range against the particle size. Where the particle size distribution is bi-modal, such a graph will be characterized by two discrete areas under a curve, each generally having a gaussian shape.

Particularly useful particle sizes for these methods meet the following criteria: (i) limit the largest size (i.e., topsize) of the coarse fraction to commercial specifications, for example, for many materials such as coal the topsize is 50 mm; (ii) minimize the quantity of fine fraction to reduce dust and other material handling problems; (iii) maximize the ratio between coarse and fine fraction particle size to promote efficient mixing of the two fractions; (iv) match the void volume in the coarse fraction with the total volume of the fine fraction; (v) maximize the topsize of the fine fraction to reduce comminations and classification costs; and (vi) use all the feed material.

Other factors that dictate the selected sizes chosen to partition the material include (i) breakage characteristics of the material; (ii) classification efficiency; (iii) material handling properties of the final product including angle of repose, angle of reclaim, internal angle of friction; (iv) coherence (i.e., the sticking of particles to one another); (v) rate of production; and (vi) final product bulk density specifications.

As an example, the methods of this embodiment can be accomplished by the process schematically depicted in FIG. 1. As shown in FIG. 1, the raw bulk material ranging from 6 inches and less (6"×0") is first fractionated with a screen having a 2 inch aperture to separate less than 2 inch fractions (−2"×0") from fractions having 2 inches and more (6"×2"). This latter fraction is further crushed, ground or pulverized to produce fractions having −2"×0" fractions and combined with the classified −2"×0" fraction. The term "classified" refers to the fraction that falls through the apertures of the fractionation device (such as a screen) as opposed to a fraction that is crushed, ground or pulverized to that size. Such fractions can be crushed, ground or pulverized according to any method known to those skilled in the art including, for example, using a roller crusher with variable speed drive and gap settings.

The resulting −2"×0" fraction is then fractionated with a screen having a 1 inch aperture to separate less than 1 inch fractions (−1"×0") from the −2"×1" fraction. The −2"×1" fraction is also referred to herein as the "coarse fraction." The −1"×0" fraction is further fractionated with a screen having a ¼ inch aperture to separate fractions of less than ¼ inch (−¼"×0") from the −1"×¼" fraction, also referred to herein as the third or intermediate fraction. This intermediate fraction is then crushed, ground or pulverized to produce fractions of −¼"×0", which is then combined with the classified −¼"×0" fractions to produce the "fine fraction." The coarse fraction is then blended with the fine fraction to produce the desired bi-modal bulk material having a first size ranging from about 1 inch to about 2 inches, and a second particle size range of less than ¼ inch. These conditions have been found by experiment to produce the highest bulk density while satisfying the criteria listed above.

A surprising discovery was made when testing the densities of (i) the classified −¼"×0" fraction, (ii) the crushed third fraction to produce a −¼"×0" fraction, and (iii) the combined fine −¼"×0" fraction. The density of the classified fraction (i) was determined to be about 44 lbs/ft$^3$ and the density of the crushed fraction (ii) was determined to be about 41 lbs/ft$^3$. However, the combined fraction (iii) was surprisingly determined to be 50 lbs/ft$^3$.

The proportion of coarse fraction is selected so that the void volume is slightly less than the volume of the fine fraction. In addition, the particle size difference between the coarse and fine fractions is maximized to promote efficient flow of the fine particles into the coarse fraction void. In a preferred embodiment, approximately 86% of the coarse fraction void is filled with the fine fraction. Preferably, the prepared coarse and fine fractions are combined in proportion such that the resulting density is 10 percent greater than the starting or feed bulk material, and preferably greater than about 55 lbs/ft$^3$, with a particularly useful range being between about 55 lbs/ft$^3$ to about 60 lbs/ft$^3$.

Figure 3:
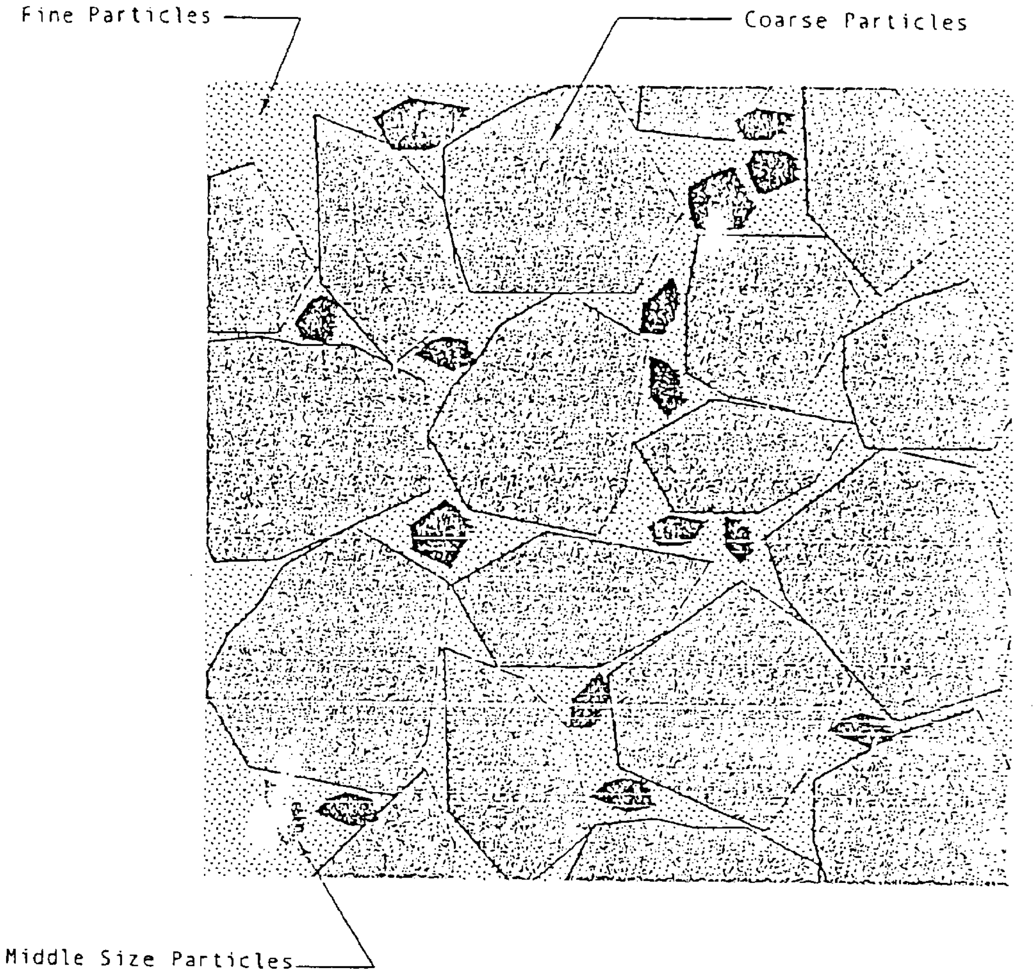
FIG. 3 is a void-filling depiction of a multiple size fraction composition having a density of 115% of normal and a void space of 28%.

In a further embodiment, the present invention provides alternative methods of increasing the density of bulk materials. The methods are generally accomplished by fractionating the starting bulk material into successively smaller particle size fractions. The largest of the fractions is first placed in a container or other holding compartment. The next smaller size fraction is then added to fill the void between the larger particles until the smaller particles begin to dilate the entire mixture and reduces the bulk density. At that point, the next successive smaller size fraction is added filling the void until the larger size particles are forced apart and the mixture begins to dilate. This process is continued until the smallest size fraction is used. The composition produced by these methods is depicted in FIG. 3.

Figure 2:
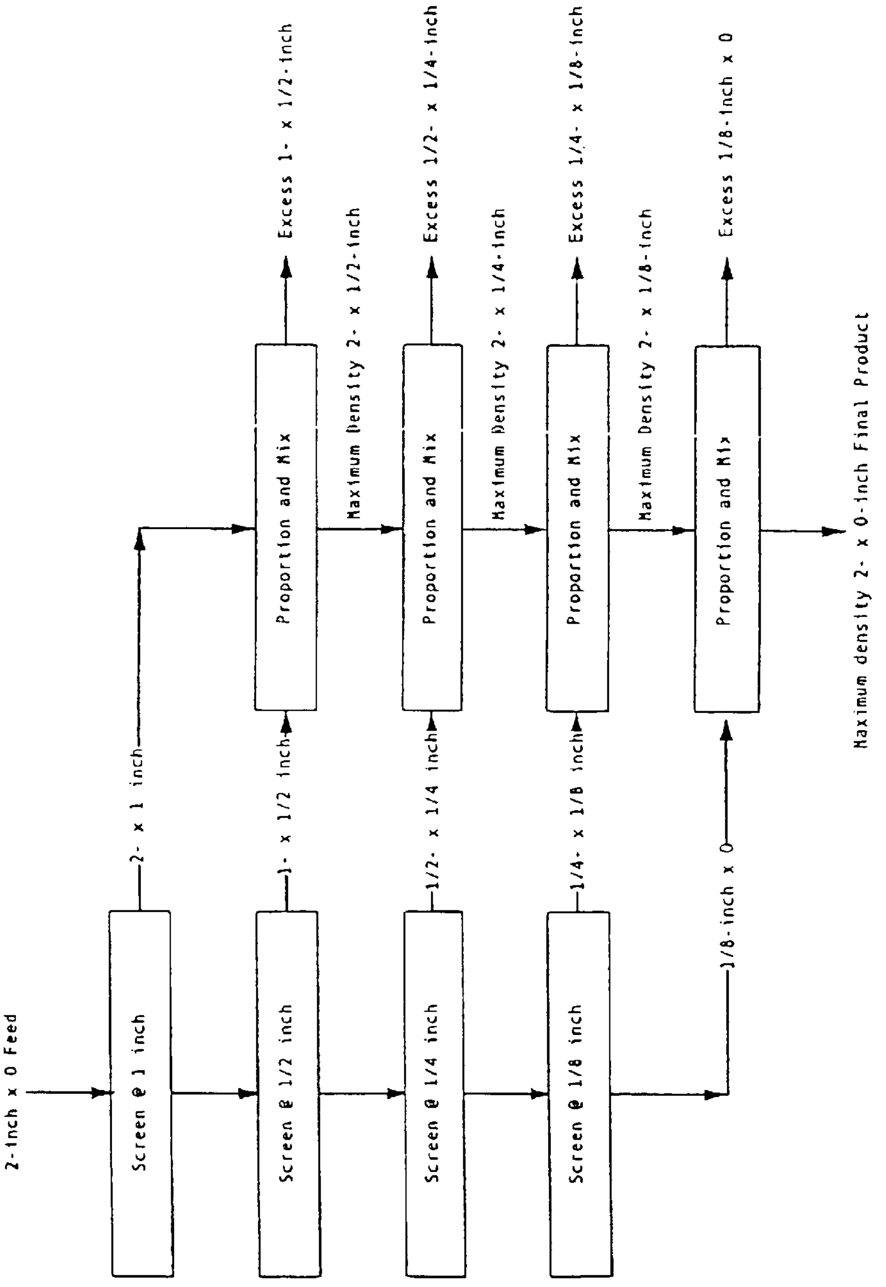
FIG. 2 is a flowchart of the method of increasing the density of bulk materials by combining successively smaller fractions to form a composition of multiple sized particles.

An example of this embodiment is shown schematically in FIG. 2. This process classifies the starting 6"×0" bulk material into numerous closely sized fractions such as 2×1 inch, 1×½ inch, ½×¼ inch, ¼×⅛ inch and less than ⅛ inch fractions. Then, starting with the largest 2×1 inch size fraction, the next smaller 1×½ inch fraction is added filling the void between the larger particles. Filling is continued until the smaller particles dilate the mixture. At that point, the next smaller ½×¼ inch fraction is added filling the void until the mixture dilates. This process is continued with the ¼×⅛ inch fraction and finally the minus ⅛ inch fraction.

The methods of the present invention also provide bulk materials having improved thermal properties, including decreased permeability and increased moisture. Decreased permeability and increased moisture retention favorably affect the ability of the bulk material to resist forming ice. Permeability measures the rate at which water flows through the particulate bulk material. Thus, low permeable materials tend to hold moisture near the surface exposed to rain and snow. The higher moisture retention capacity absorbs moisture before it can saturate the material and form channels. Accordingly, lower permeability and higher moisture retention result in greater ice formation near the top of the conveyance that can be readily discharged from the conveyance along with the bulk material. In addition, bulk materials with lower permeability will shed water more effectively when stored in a storage pile. Thus, more water will run off the pile rather than being soaked into the bulk material.

Thus, the methods of improving the thermal properties of bulk materials favorably affect the following two factors that control the formation of ice in bulk materials: (i) rate of heat transfer from the warm bulk material to the cold environment, and (ii) concentration of water (the source material for ice) on the surface of the bulk material.

With regard to the first factor, ice forms when sufficient heat transfers from the warm bulk material to the cold environment. Such conduction heat transfer is evaluated using Fourier's law as detailed in Reynolds & Perkins, *Engineering Thermodynamics* (McGraw-Hill Book Co., 1970).

In transient heat flow conditions present in transporting bulk material, the rate of heat transfer by conduction and convection between the bulk material and the environment is a function of two factors, including the thermal conductivity and thermal capacitance of the material. Other heat transfer factors that are independent of the properties of the bulk material, include surface area exposed to cold temperatures, temperature difference between the bulk material and the environment, and time. In a convection heat transfer system, typical of transporting bulk material in a conveyance, heat transfer between the bulk material and the environment occurs when cold air passes over the exposed surface of the warm bulk material and cools the surfaces of the conveyance that are in contact with the bulk material.

By decreasing the permeability and increasing the density of a bulk material according to the methods of the present invention, heat transfer by cold air passing over the exposed surface of the bulk material is significantly reduced. Decreasing permeability impedes the flow of cold air from the cold environment into the interstitial space between particles of the bulk material. Impeding flow reduces the mass of air available to transfer heat and reduces the average velocity of air moving through the interstitial spaces.

According to fundamentals in heat transfer, the quantity of heat transferred from a warm solid to a moving fluid, such as air, decreases as mass and velocity of the fluid decreases. Increasing bulk density provides more mass per unit volume. This effect proportionally increases thermal capacity, which is the ability of a material to resist changing temperature. In other words, for a given heat transfer condition, a massive material with a higher thermal capacity will experience a lower temperature change than a less massive material with a lower thermal capacity. Therefore, reducing the rate of heat transfer by convection and providing greater thermal capacity creates a condition less favorable to forming ice.

As noted above, the second factor that affects the formation of ice is water concentration. Water concentrated on the surface of bulk materials (surface moisture) is the source for ice. Surface moisture has two principal sources: (i) water introduced during processing (typically between two and five weight percent concentration), and (ii) rain and snow falling during transport.

Ice usually forms where liquid water has pooled. Surface moisture introduced during processing is distributed throughout the bulk material, so pooling is not usually a problem from this source. Water introduced by rain and snow flows from the exposed surface throughout the bulk material and congregates in pools. Pooled moisture near cold exposed surfaces of the conveyance can freeze to form ice, particularly at the bottom of the conveyance. The frozen pools makes discharging the bulk material from the conveyance difficult. In contrast, the methods of the present invention result in greater ice formation near the top of the conveyance that can be readily discharged from the conveyance along with the bulk material.

The present invention further provides methods of reducing the density of bulk materials. The density of bulk materials can be reduced by creating more void space between particles to promote, for example, the flow of gases and liquids between particles. Thus, the permeability of the bulk material increases as void space increases. The relationship between void space and permeability for a desired density can be readily determined by those skilled in the art. For many bulk materials, such as sulfide ores and limestones, for example, the void space can be increased from 30% to 50% by reducing the concentration of fine particles.

Figure 5:
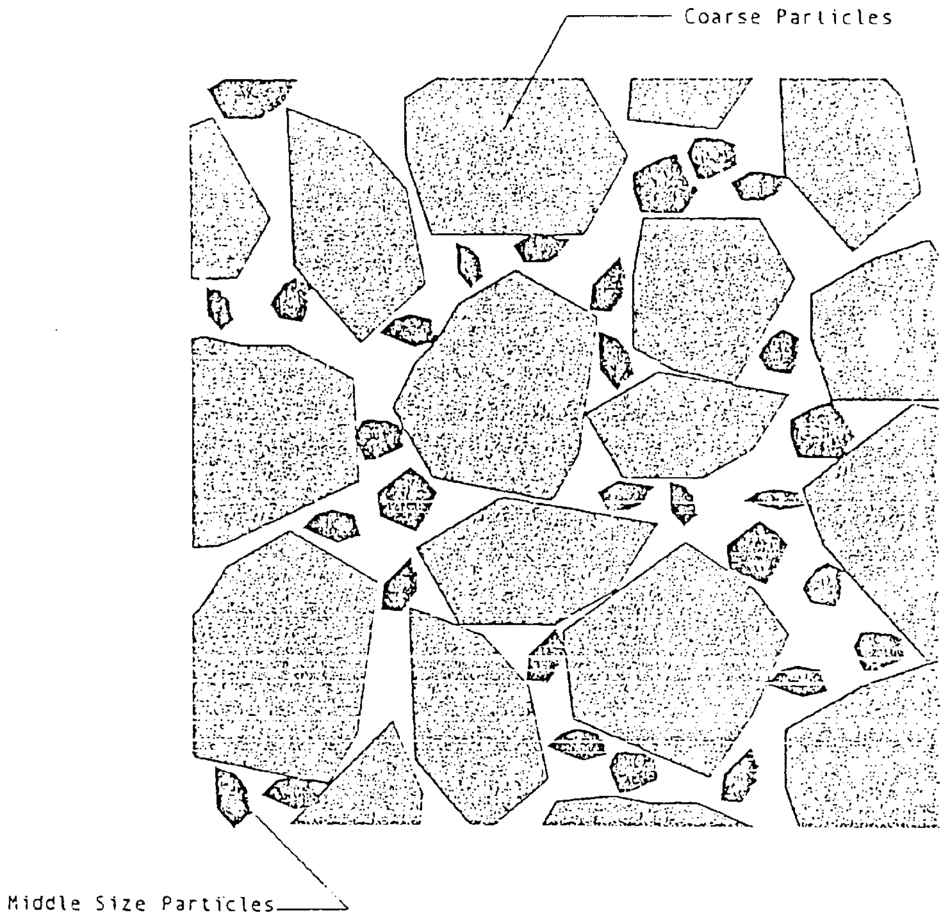
FIG. 5 is a void-filling depiction of a composition produced by combining two particle size fractions in which the composition is overfilled with the smaller size fraction resulting in a density of 95% of normal and a void space of 40%.
Figure 6:
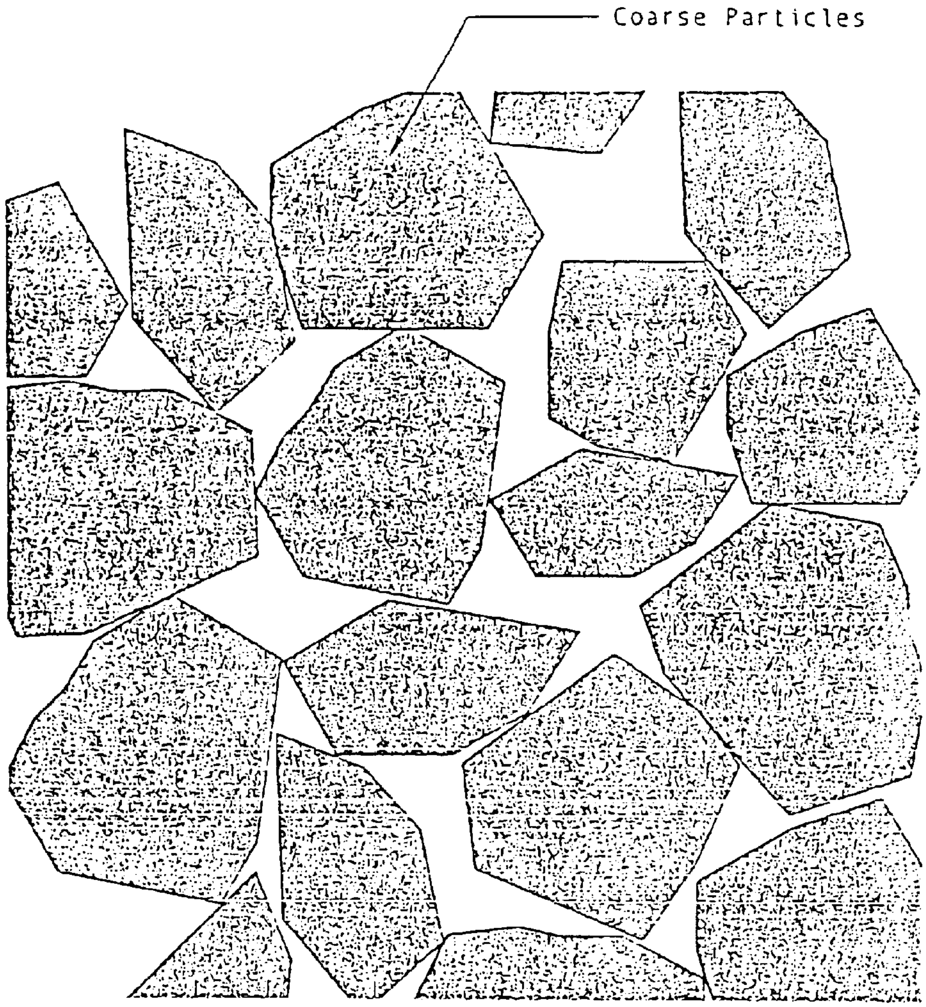
FIG. 6 is a void-filling depiction of a composition having mono-sized particles with a bulk density of 85% of normal and a void space of 45%.
Figure 7:
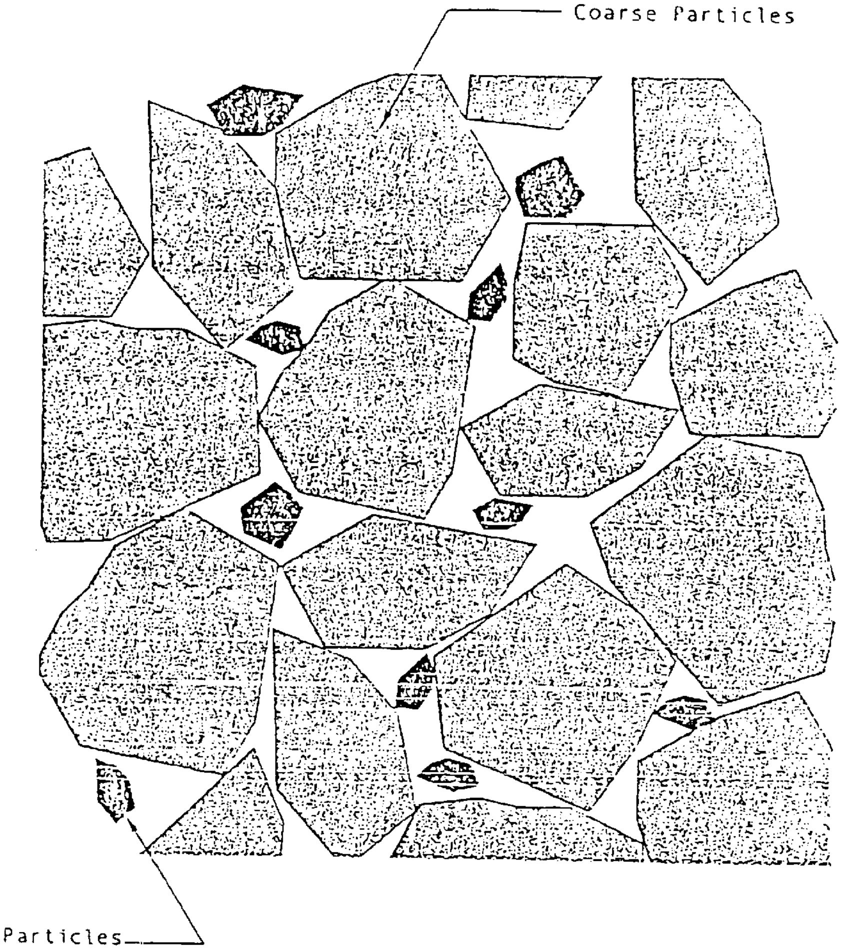
FIG. 7 is a void-filling depiction of a composition produced by combining two particle size factions in which the composition is underfilled with the smaller size fraction resulting in a density of 95% of normal and a void space of 40%.

Void space can be increased by removing fine particles or increasing the proportion of coarse particles in the bulk material. For example, screening out or agglomerating fine particles will increase the void. As an alternative, one or more selected or predetermined size fractions can be added to the bulk material in sufficient quantity to "overfill" the void to dilate the entire material. In addition, certain crushers, such as roll crushers and jaw crushers, can be used to create fewer fine particles than crushers and pulverizers that use impact as the primary crushing force. These various methods can be used to obtain bulk materials having densities that are less than normal densities as depicted, for example, in FIGS. 5, 6 and 7.

The present methods for reducing the density of bulk materials would be useful for storing or treating bulk materials with chemicals or when exposure to heat, air (i.e. oxidation), other gases or liquids is desired. These methods are particularly desirable when advantageous chemical reactions take place between solids and the gas or liquid. Applications for such methods include, for example, leaching ores with acid and cyanide solutions, or roasting materials with hot gases in fluid-bed reactors.

The following examples are intended to illustrate, but not limit, the present invention. In the following examples, samples of bituminous coal, subbituminous coal, lignite and limestone were tested to increase bulk density by modifying particle size distribution. In many cases, the bulk density was increased by 10 percent by modifying the particle size distribution. The bulk density of existing commercial coal and lignite ranges from 45 to 50 pounds per cubic foot (PCF). The bulk density of crushed limestone ranges from 105 to 110 PCF.

EXAMPLE 1

Subbitiminous Coal

The bulk density of a sized coarse material increases by adding sufficient fine particles to fill the void surrounding the coarse particles. Successively finer particles can be used to fill the resulting voids until the entire mass dilates. The midsize fraction, 1-×½-inch size fraction, was not added.

Table 1 lists bulk density measurements obtained for Powder River Basin subbituminous coal by adding increasing amounts of various fine (minus ½-inch) size fractions to 2-×1-inch size fraction.

TABLE 1

Bulk Density Results for Various Combinations of Size Fractions Powder River Basin Subbituminous Coal

| | | | Cumulative Weights (kg) | | | | | |
|---|---|---|---|---|---|---|---|---|
| Step | Size Fraction Added | Weight Added, kg | 2-inch × 1-inch | ½-inch × ¼-inch | ¼-inch × 6M | 6M × 14M | 14M × 0 | Loose Bulk Density (PCF) |
| 1 | 2 × 1 | 13.00 | 13.00 | 0.00 | 0.00 | 0.00 | 0.00 | 40.7 |
| 2 | ½ × ¼ | 3.00 | 13.00 | 3.00 | 0.00 | 0.00 | 0.00 | 44.3 |

TABLE 1-continued

Bulk Density Results for Various Combinations of Size Fractions Powder River Basin Subbituminous Coal

| Step | Size Fraction Added | Weight Added, kg | Cumulative Weights (kg) 2-inch × 1-inch | ½-inch × ¼-inch | ¼-inch × 6M | 6M × 14M | 14M × 0 | Loose Bulk Density (PCF) |
|---|---|---|---|---|---|---|---|---|
| 3 | ½ × ¼ | 3.00 | 13.00 | 6.00 | 0.00 | 0.00 | 0.00 | 49.2 |
| 6 | ¼ × 6M | 6.00 | 13.00 | 6.00 | 6.00 | 0.00 | 0.00 | 48.8 |
| 7 | ¼ × 6M | 3.00 | 13.00 | 6.00 | 9.00 | 0.00 | 0.00 | 49.1 |
| 8 | 6 × 14M | 6.00 | 13.00 | 6.00 | 9.00 | 6.00 | 0.00 | 49.6 |
| 9 | 6 × 14M | 6.00 | 13.00 | 6.00 | 9.00 | 12.00 | 0.00 | 49.7 |
| 10 | 6 × 14M | 5.29 | 13.00 | 6.00 | 9.00 | 17.29 | 0.00 | 49.8 |
| 12 | 14M × 0 | 12.00 | 13.00 | 6.00 | 9.00 | 17.29 | 12.00 | 54.8 |
| 13 | 14M × 0 | 12.00 | 13.00 | 6.00 | 9.00 | 17.29 | 24.00 | 56.3 |

Results demonstrate that bulk density increases as fines are added to fill the void around course particles. Step 13 product was chosen for additional investigation because it had the highest bulk density, 56.3 PCF, of any product produced by the experiment.

Table 2 compares the particle size distribution and bulk density of typical commercially available 2-inch×0 Powder River Basin subbituminous coal to the sample prepared in Step 13 of Table 1.

TABLE 2

Comparison of Commercial 2-inch × 0 and Specially Prepared High-Density Powder River Basin Subbituminous Coal

| Size Fraction | Direct Weight Percent Commercial Coal | Step 13 Table 1 High Density Formulation |
|---|---|---|
| Plus 2-inch | 4% | 0% |
| 2 × 1 inch | 21% | 19% |
| 1 × ½ inch | 23% | 0% |
| ½ × ¼ inch | 20% | 9% |
| ¼ inch × 6M | 12% | 13% |
| 6M × 14M | 11% | 25% |
| 14M × 0 | 10% | 35% |
| Bulk Density (loose) | 49.5 PCF | 56.3 PCF |

Figure 8:
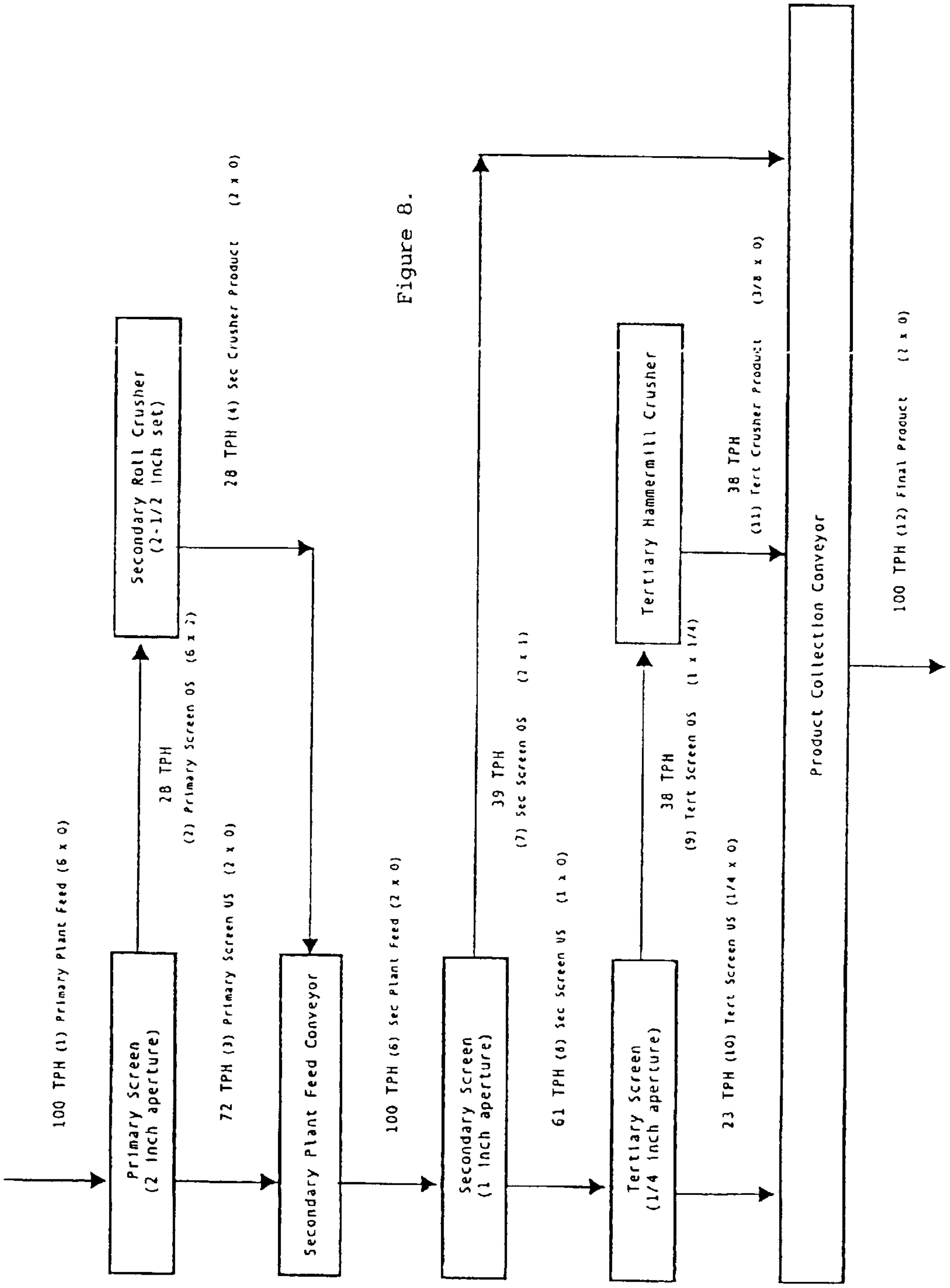
FIG. 8 is a flowsheet of a process for producing high density bulk materials that includes vibrating screens, double-roll crusher and hammermill.

A sample of 6-inch×0 Powder River Basin subbituminous coal was screened and crushed similarly to coal processed by the flowsheet shown in FIG. 8. The flow rates indicated next to each flowstream were computed based on crushing tests and screen manufacturer's performance data. Table 3 lists the estimated particle size distribution of final high-density product produced by the flowsheet. A 20-kg sample representing the final high-density product was prepared by combining various size fractions together in the proportions listed in Table 3.

TABLE 3

Size Distribution of High Bulk Density Powder River Basin Subbituminous Coal Product Produced by Screening and Crushing

| Size Fraction | High Bulk Density Product |
|---|---|
| Plus 2-inch | 1% |
| 2 × 1 inch | 36% |
| 1 × ½ inch | 2% |
| ½ × ¼ inch | 10% |
| ¼ inch × 6M | 20% |
| 6M × 14M | 18% |
| 14M × 0 | 13% |
| Bulk Density (loose) | 56.4 PCF |

EXAMPLE 2

Subbituminous Coal

A commercial process using a combination of vibrating screens and crushers could be developed to produce a high-density product similar to the sample listed in Step 13 in Table 1. FIG. 8 shows a possible process flowsheet that includes vibrating screens, double-roll crusher and hammer-mill. The process shown in FIG. 8 mixes a coarse fraction (2-×1-inch) with a fines fraction (¼-inch×0 screenings with crushed material) to form the high-density product.

EXAMPLE 3

Bituminous Coal

A sample of ¾-inch×0 Utah bituminous coal was tested to measure how changes in particle size distribution affected loose bulk density. Table 4 compares the size distribution of commercial minus ¾-inch product with a sample of a specified particle size distribution designed to produce a high bulk density.

TABLE 4

Comparison of Commercial ¾-inch × 0 and Specially Prepared High Density Utah Bituminous Coal

| Size Fraction | Direct Weight Percent | |
|---|---|---|
| | Natural Crushed Coal | High Density Formulation |
| Plus ¾-inch | 3% | 14% |
| ¾ × ¼ inch | 30% | 39% |
| ¼-inch × 8M | 27% | 21% |
| 8M × 28M | 24% | 15% |
| 28M × 0 | 16% | 10% |
| Bulk Density (loose) | 54 PCF | 59.7 PCF |

EXAMPLE 4

Lignite

A sample of ¾-inch×0 Texas lignite was tested to measure how changes in particle size distribution affected loose bulk density. Table 5 presents a particular size distribution that produced the relatively high bulk density of 55.0 PCF. The bulk density of typical lignite produced by a commercial mine ranges from 45 to 50 PCF.

TABLE 5

Size Distribution of High Bulk Density Texas Lignite Product Produced by Screening and Crushing

| Size Fraction | High Bulk Density Product |
|---|---|
| Plus ½-inch | 18% |
| ½ × ¼ inch | 15% |
| ¼ inch × 8M | 19% |
| 8M × 10M | 6% |
| 10M × 28M | 15% |
| 28M × 0 | 27% |
| Bulk Density (loose) | 55.0 PCF |

EXAMPLE 6

Limestone

Table 6 lists bulk density measurements obtained for crushed limestone by adding increasing amounts of various fine (minus ¾-inch) size fractions to a 1-×¾-inch size fraction.

TABLE 6

Bulk Density Results for Various Combinations of Size Fractions Crushed Limestone

| Step | Size Fraction Added | Weight Added, kg | Cumulative Weights (kg) | | | | | Loose Bulk Density (PCF) |
|---|---|---|---|---|---|---|---|---|
| | | | 1-inch × ¾-inch | ¾-inch × ¼-inch | ¼-inch × 8M | 8M × 28M | 28M × 0 | |
| 1 | 1 × ¾ | 12.52 | 12.52 | 0 | 0.00 | 0.00 | 0.00 | 90.5 |
| 2 | ¾ × ¼ | 2.18 | 12.52 | 2.18 | 0.00 | 0.00 | 0.00 | 91.0 |
| 3 | ¾ × ¼ | 2.18 | 12.52 | 4.36 | 0.00 | 0.00 | 0.00 | 91.5 |
| 6 | ¾ × ¼ | 3.5 | 12.52 | 7.86 | 0.00 | 0.00 | 0.00 | 91.2 |
| 7 | ¼ × 8M | 5.47 | 12.52 | 7.86 | 5.47 | 0.00 | 0.00 | 96.9 |
| 8 | ¼ × 8M | 5.53 | 12.52 | 7.86 | 11.00 | 0.00 | 0.00 | 104.5 |
| 9 | ¼ × 8M | 5.35 | 12.52 | 7.86 | 16.35 | 0.00 | 0.00 | 105.7 |
| 10 | ¼ × 8M | 11.00 | 12.52 | 7.86 | 27.35 | 0.00 | 0.00 | 106.1 |
| 12 | 8M × 28M | 15.34 | 12.52 | 7.86 | 27.35 | 15.34 | 0.00 | 110.2 |
| 13 | 8M × 28M | 15.30 | 12.52 | 7.86 | 27.35 | 30.63 | 0.00 | 110.8 |
| 14 | 8M × 28M | 15.26 | 12.52 | 7.86 | 27.35 | 45.89 | 0.00 | 110.3 |
| 15 | 28M × 0 | 22.79 | 12.52 | 7.86 | 27.35 | 45.89 | 22.79 | 112.7 |
| 16 | 28M × 0 | 7.60 | 12.52 | 7.86 | 27.35 | 45.89 | 30.38 | 117.8 |
| 17 | 28M × 0 | 7.60 | 12.52 | 7.86 | 27.35 | 45.89 | 37.98 | 119.2 |
| 18 | 28M × 0 | 14.96 | 12.52 | 7.86 | 27.35 | 45.89 | 52.94 | 118.4 |
| 19 | 28M × 0 | 7.60 | 12.52 | 7.86 | 27.35 | 45.89 | 60.54 | 118.0 |

EXAMPLE 6

Study of Middle-Sized Particles

An experiment was conducted using subbituminous coal to measure the effect of changing the concentration of middle sized particles on bulk density. Naturally broken material contains middle size particles, which may account for natural materials consistently having a lower bulk density than the higher bulk density compositions consisting of coarse and fine particles described herein. An equal ratio of fine and coarse particles was chosen as a mixture that produces a high-density product. The middle size particles dilute the fixed amount of fine and coarse particles. The coarse size fraction was 2-×1-inch, the middle size fraction was 1-×¼-inch, and the fine particle fraction was minus ¼-inch screenings. Coal with minimal surface moisture was used. The bulk density container was lightly tapped as it was filled.

The results of the experiments, as listed in Table 7, are consistent with the concept that middle size particles affect bulk density by impeding flow of fines particles into voids. Middle size particles further reduce bulk density by forcing large particles apart.

TABLE 8-continued

Properties of Typical Commercial and High-Density Subbituminous Coal Samples

| Parameter | Commercial Sample | High-Density Sample |
|---|---|---|
| Plus ¾-inch wt % | 32% | 32% |
| ¾- × ¼-inch wt % | 28% | 0% |
| Minus ¼-inch wt % | 40% | 68% |

B. Thermal Capacity Tests

Approximately 185-kg of commercial sub-sample was loaded into a 7.70 cubic-foot capacity (55-gallon) poly drum. Approximately 206 kg of high-density sub-sample was loaded into a similar drum. Each drum, measuring 24-inches in diameter and 36-inches high, was filled within 2 inches of the top rim.

Two platinum resistance temperature detector (RTD) probes were inserted into each sample to measure material temperatures. The first probe was inserted along the vertical centerline 24 inches into the material to measure temperatures at the center of mass. The second probe was inserted

TABLE 7

Changes in Bulk Density Resulting from Varying Concentration of Middle Size Fraction Concentration 2-inch × 0 PRB Subbituminous Coal

| Weights (kg) | | | Weight Percents | | | Bulk Density Results (lightly tapped) | | |
|---|---|---|---|---|---|---|---|---|
| Coarse 2 × 1" | Middle 1 × ¼" | Fine - ¼ inch screenings | Coarse 2 × 1" | Middle 1 × ¼" | Fine - ¼ inch screenings | Total Wt (kg) | Volume (cu ft) | Bulk Density (lb/cu ft) |
| 14.37 | 0.00 | 0.00 | 100% | 0% | 0% | 14.37 | 0.73 | 43.4 |
| 0.00 | 15.82 | 0.00 | 0% | 100% | 0% | 15.82 | 0.73 | 47.8 |
| 0.00 | 0.00 | 15.92 | 0% | 0% | 100% | 15.92 | 0.73 | 48.1 |
| 10.00 | 0.00 | 10.00 | 50% | 0% | 50% | 19.39 | 0.73 | 58.6 |
| 10.00 | 2.00 | 10.00 | 45% | 9% | 45% | 18.98 | 0.73 | 57.3 |
| 10.00 | 4.50 | 10.00 | 41% | 18% | 41% | 18.84 | 0.73 | 56.9 |
| 10.00 | 12.00 | 10.00 | 31% | 38% | 31% | 18.25 | 0.73 | 55.1 |
| 3.60 | 10.80 | 3.60 | 20% | 60% | 20% | 17.07 | 0.73 | 51.6 |

EXAMPLE 7

Thermal Capacity

A. Sample Description

A 400-kg bulk sample of nominal minus 2-inch subbituminous coal obtained from an operating coal mine was split into two 200-kg sub-samples. The first sub-sample represented a typical commercial bulk material commonly shipped from mines in rail cars. The second sub-sample was processed to obtain a high-density, low-porosity material at least 10 percent greater than commercial products. Table 8 lists material properties of the typical commercial and processed subbituminous coal.

TABLE 8

Properties of Typical Commercial and High-Density Subbituminous Coal Samples

| Parameter | Commercial Sample | High-Density Sample |
|---|---|---|
| Bulk density | 53 PCF | 59 PCF |
| Porosity, Volume % | 32 volume % | 24 volume % |

at a point 6 inches from the wall of the drum and 12 inches into the material to measure temperatures along the outer wall of the drum. The RDT probes were connected to an automatic data acquisition system to monitor and log temperatures for the duration of the experiment.

The commercial and high-density sample drums were placed into a sealed insulated enclosure. The interior temperature of the enclosure was maintained between 10 and 15° F. cooler than the initial sample temperature. Sample temperatures were recorded until the sample cooled to approximately the same temperature as the enclosure.

The rate of temperature change, an important parameter that characterizes a sample's thermal properties in transient conditions, was determined from noting changes in successive temperature readings taken at 6 inches from the wall of the container. Table 9 lists the rate of temperature change for the initial 16 hours for commercial and high-density samples. When exposed to cold temperatures, warm commercial sample in proximity of the wall cools more readily than the warm high-density sample. This fact demonstrates that the commercial bulk material will freeze more quickly than the high-density bulk material.

TABLE 9

| Rate of Temperature Change (° F./hr) at 6 Inches from Wall 30° F. Ambient, 60° F. Initial Sample Temperature | | | |
|---|---|---|---|
| Time, Hours | Commercial Sample | High-density Sample | Difference, ° F./hr |
| Start (0 hrs) | 0.00 | 0.00 | 0.00 |
| 1 hours | −0.10 | −0.05 | 0.05 |
| 3 hours | −0.68 | −0.12 | 0.56 |
| 4 hours | −0.79 (peak rate) | −0.28 | 0.51 |
| 8 hours | −0.50 | −0.40 (peak rate) | 0.10 |

EXAMPLE 8

A. Sample Description—Permeability and Moisture Retention Experiments

A 20-kg bulk sample of nominal minus ¾-inch bituminous coal obtained from an operating fossil-fired power plant was split into two 10-kg sub-samples. The first sub-sample represented a typical bulk material commonly used as fuel at fossil-fired power plants. The second sub-sample was processed to obtain a high density, low porosity material at least 10 percent greater than commercial products. Table 10 lists material properties of the typical commercial and processed bituminous coal.

TABLE 10

| Properties of Typical Commercial and High-Density Bituminous Coal Samples | | |
|---|---|---|
| Parameter | Commercial Sample | High-Density Sample |
| Bulk density | 55 PCF | 61 PCF |
| Porosity, Volume % | 31 volume % | 23 volume % |
| Plus ½-inch wt % | 30% | 40% |
| ½-inch × 6-mesh wt % | 40% | 0% |

B. Permeability and Moisture Retention Tests

Samples of dry commercial and high-density bituminous coal were loaded into a round pipe 15.2 cm in diameter to a depth of 36 cm. The round pipe was fitted with a fine mesh screen on the bottom, and was open on the top.

The pipe was filled with untreated coal, and 1,500 ml of water was quickly poured on top of the sample, forming a pool approximately 8 cm deep. The time required for the water to flow into the sample was noted. The experiment was repeated with treated high-density coalof 61 pounds/cubic foot. Samples of dry untreated and treated high-density coal were immersed in water and drained on a fine-mesh screen. The amount of moisture retained in the samples was measured. Results of the permeability and moisture retention tests are summarized in Table 11.

TABLE 11

| Permeability and Moisture Retention of Untreated and Treated Bituminous Coal Sample | | | |
|---|---|---|---|
| Test | Untreated, 55 PCF | Treated 61 PCF | % Change |
| Permeability, cm/sec | $42 \times 10^{-3}$ cm/sec | $3.2 \times 10^{-3}$ cm/sec | Decreased 92% |
| Moisture content at saturation, wt % moisture | 13.7% moisture | 21.1% moisture | Increased 54% |

While various embodiments of the present invention have been described in detail, it is apparent that modifications and adaptations of those embodiments will occur to those skilled in the art. It is to be expressly understood, however, that such modifications and adaptations are within the scope of the present invention.

What is claimed is:

1. A method of increasing the density of a bulk material, comprising the steps of:

(a) separating the bulk material into increasingly smaller sized fractions of the bulk material;

(b) placing the largest sized fraction into a confined area;

(c) adding a second sized fraction to the largest sized fraction until the second sized fraction begins to dilate the largest sized fraction to form a first combined material; and (d) adding successively smaller sized particle fractions to the first combined material until each addition begins to dilate a previous combined material to produce a final bulk material having a desired density.

2. The method of claim 1, wherein said material is a bulk fuel material.

3. The method of claim 2, wherein said bulk fuel material is coal.

4. The method of claim 3, wherein the coal is bituminous coal, subbitummous coal, or lignite.

* * * * *